US008874845B2

(12) United States Patent
Narayanan et al.

(10) Patent No.: US 8,874,845 B2
(45) Date of Patent: Oct. 28, 2014

(54) CACHE STORAGE OPTIMIZATION IN A CACHE NETWORK

(75) Inventors: Ashok Narayanan, Lexington, MA (US); David R. Oran, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 258 days.

(21) Appl. No.: 13/443,761

(22) Filed: Apr. 10, 2012

(65) Prior Publication Data

US 2013/0268733 A1  Oct. 10, 2013

(51) Int. Cl.
*G06F 12/00* (2006.01)

(52) U.S. Cl.
USPC .......................... 711/118; 711/119; 711/138

(58) Field of Classification Search
CPC ............ G06F 12/0813; G06F 12/0868; G06F 12/0871; G06F 12/0888; G06F 12/12
USPC .................. 711/118, 119, 133, 165, 138, 145
See application file for complete search history.

(56) References Cited

U.S. PATENT DOCUMENTS

| | | | |
|---|---|---|---|
| 5,544,327 A | | 8/1996 | Dan et al. |
| 5,572,645 A | | 11/1996 | Dan et al. |
| 5,649,156 A | * | 7/1997 | Vishlitzky et al. ............ 711/136 |
| 6,049,850 A | * | 4/2000 | Vishlitzky et al. ............ 711/136 |
| 6,560,678 B1 | * | 5/2003 | Weissman et al. ............. 711/133 |
| 7,493,389 B2 | | 2/2009 | Aviani, Jr. et al. |
| 7,574,500 B2 | | 8/2009 | Roddy |
| 7,697,534 B1 | | 4/2010 | Narayanan et al. |
| 7,761,572 B1 | | 7/2010 | Auerbach |
| 7,792,111 B2 | | 9/2010 | Narayanan et al. |
| 2002/0138640 A1 | * | 9/2002 | Raz et al. ....................... 709/231 |
| 2002/0184403 A1 | * | 12/2002 | Dahlin et al. .................. 709/316 |
| 2004/0162943 A1 | * | 8/2004 | Degenaro et al. .............. 711/118 |
| 2005/0188073 A1 | * | 8/2005 | Nakamichi et al. ............ 709/223 |
| 2005/0240735 A1 | * | 10/2005 | Shen et al. ..................... 711/144 |
| 2008/0098169 A1 | * | 4/2008 | Kaluskar et al. ............... 711/113 |
| 2009/0157974 A1 | * | 6/2009 | Lasser ............................ 711/135 |
| 2010/0030963 A1 | * | 2/2010 | Marcu et al. .................. 711/118 |
| 2012/0096140 A1 | * | 4/2012 | Gerber et al. .................. 709/223 |
| 2012/0246411 A1 | * | 9/2012 | Birka et al. .................... 711/133 |
| 2012/0290677 A1 | * | 11/2012 | Puthalath et al. ............. 709/214 |
| 2013/0086327 A1 | * | 4/2013 | Coulson et al. ................ 711/125 |
| 2013/0215756 A1 | * | 8/2013 | Jeon et al. ..................... 370/238 |

* cited by examiner

*Primary Examiner* — John Lane
(74) *Attorney, Agent, or Firm* — Cindy Kaplan

(57) ABSTRACT

In one embodiment, a method includes receiving data at a cache node in a network of cache nodes, the cache node located on a data path between a source of the data and a network device requesting the data, and determining if the received data is to be cached at the cache node, wherein determining comprises calculating a cost incurred to retrieve the data. An apparatus and logic are also disclosed.

20 Claims, 4 Drawing Sheets

CACHE STORAGE OPTIMIZATION IN A CACHE NETWORK

TECHNICAL FIELD

The present disclosure relates generally to communication networks, and more particularly, to cache storage optimization.

BACKGROUND

Network caching is used to keep frequently accessed information in a location close to a requester of the information. Cache networks include cache nodes with finite storage. In order to be cost efficient and enable an efficient use of data, cache storage in dynamic caching networks is typically much smaller than the content space. The cache storage typically relies on unequal content access patterns in order to yield disproportionately high bandwidth gains with smaller storage sizes. Conventional cache networks utilize cache algorithms to determine which content is to be stored in a local cache and which content is to be evicted. Examples of cache algorithms include Least Recently Used (LRU), which discards the least recently used items first, and Least Frequently Used (LFU), which discards the least popular content. Conventional cache networks and algorithms do not efficiently utilize cache storage across the network and nodes within the network.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
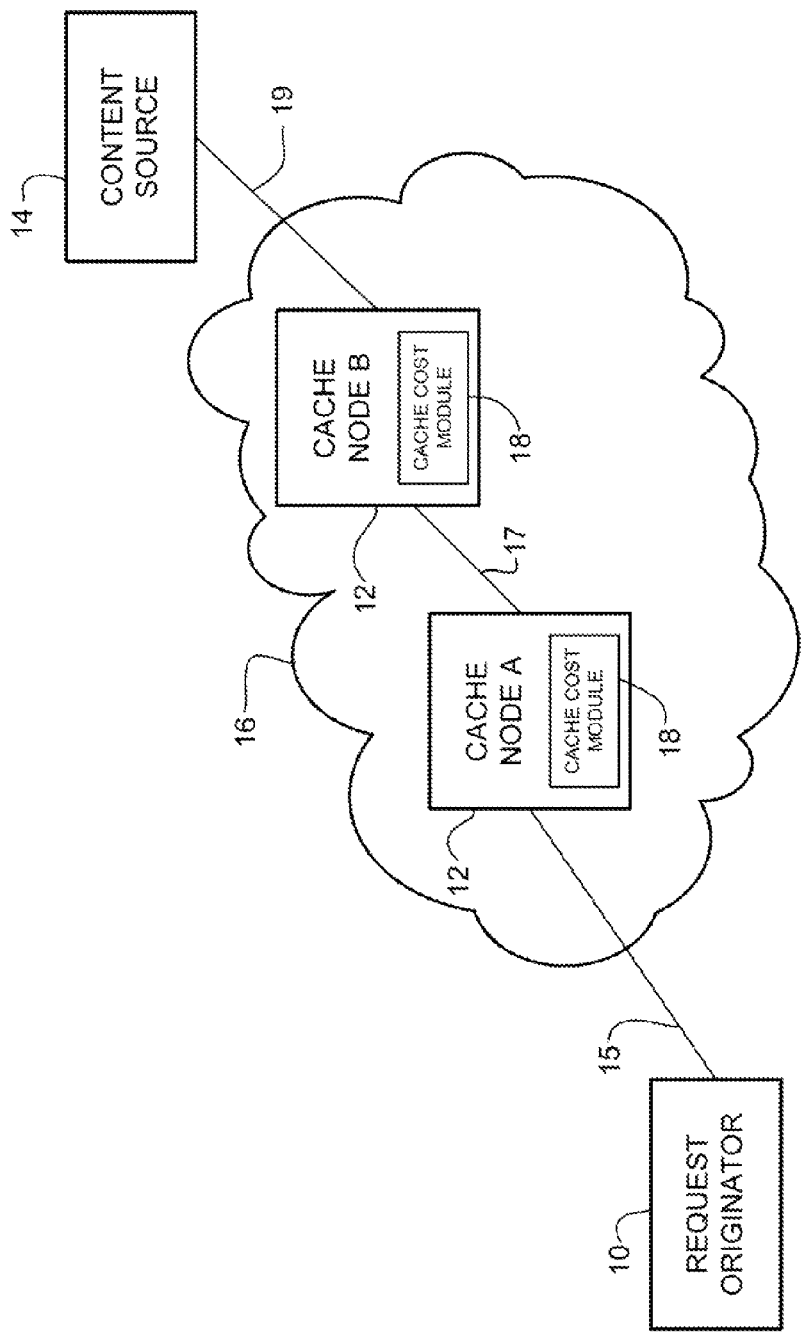
FIG. 1 illustrates an example of a network in which embodiments described herein may be implemented.

In one embodiment, a method generally comprises receiving data at a cache node in a network of cache nodes, the cache node located on a data path between a source of the data and a network device requesting the data, and determining if the received data is to be cached at the cache node, wherein determining comprises calculating at the cache node, a cost incurred to retrieve the data.

In another embodiment, an apparatus generally comprises a processor for processing data received in a network of cache nodes, in a data path between a source of the data and a network device requesting the data, and determining if the received data is to be cached at the apparatus, wherein determining comprises calculating a cost incurred to retrieve the data. The apparatus further comprises cache storage for storing cached data.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Conventional cache networks suffer from two significant drawbacks. First, conventional networks do not optimize the use of caches across multiple nodes. For example, the same data may appear in multiple caches, while other data is not cached at all, resulting in an inefficient use of caches in the network. Second, conventional networks do not account for differences in bandwidth and storage in the network. The role of a cache node is to alleviate upstream bandwidth, however, not all bandwidth costs the same. For example, cache nodes on either side of a 20 Gb/s link bundle do not need to store the same set of data as cache nodes on either side of a slow transoceanic path. The cache nodes located at opposite ends of the large bandwidth link bundle may not need to cache the same content, whereas it may be desirable for the caches nodes at opposite ends of the slow path to cache the same content.

In order for cache nodes within a network to coordinate and identify which data needs to be cached and where it should be cached, information needs to be shared among nodes. Due to the large number of cacheable items, it is not feasible to run a protocol sharing per-item cache information between cache peers.

The embodiments described herein may be used to determine whether or not a cache node in a cache network should cache data based on an estimate of the cost of not caching the data (i.e., expected cost to retrieve data if the data is not cached and later requested at the cache node). The embodiments provide significant improvement of cache utilization in a network of cache nodes, while not requiring the nodes to exchange protocol information at the granularity of individual cache content.

As described in detail below, when a cache node receives data requested by a downstream node and transmitted from an upstream source, the cache node determines whether or not to cache the data based on a cost function representing an expected cost to retrieve the data. In one embodiment, the determination as to whether or not to cache the data is based on a cost to retrieve the data. The cost of retrieving the data may be based on a number of factors, including for example, the cost to retrieve the data from an upstream node and the cost to the upstream node to retrieve the data. The cost function may also be based on an expectation that the data would be requested again. The expectation that the data would be requested again at the cache node may include a combination of factors such as the number of times the data has been requested in the past, downstream density of the cache node (i.e., how many caches and/or clients the cache node serves), and whether or not the downstream node will cache the data. It is to be understood that any combination of these or other factors may be used to calculate the expected cost of retrieving the data. Examples of factors used in the calculation are described further below.

Referring now to the drawings, and first to FIG. 1, an example of a network in which embodiments described herein may be implemented is shown. For simplification, only a small number of nodes are shown. The network includes a cache network comprising a plurality of cache nodes 12. Each cache node 12 includes cache storage for storing received content (data) and a cache cost module 18 operable to calculate a cost for use in determining if received content is to be cached at the node. The cache node 12 may comprise, for example, a router, switch, gateway, proxy, server, or other network device.

In the example shown in FIG. 1, a request originator 10 is in communication with a content source 14 via cache nodes 12 (cache node A and cache node B) in network 16. The network 16 may include one or more networks (e.g., local area network, metropolitan area network, wide area network, enterprise network, Internet, intranet, radio access network, public switched network, or any other network or combination of networks). The data path between the request originator 10 and source 14 may include any number or type of intermediate nodes (e.g., routers, switches, gateways, or other network devices), which facilitate passage of data between the endpoints (request originator, source). For example, there may be any number of non-cache intermediate nodes on paths 15, 17, and 19. Also, there may be any number of cache nodes 12 or endpoints. Each cache node 12 may be located, for example, within any number of communication paths between any number of endpoints. Thus, cache storage at node A may be used to store data received from any number of sources 14 or requested by any number of data requesters 10. Also, the endpoints 10, 14 may operate as source nodes or receiver (destination) nodes.

The endpoints 10, 14 are configured to originate or terminate communications over the network 16 and may comprise any network device or combination of devices configured for receiving, transmitting, or receiving and transmitting data. Data may include, for example, video, images, graphics, text, Web pages, audio, or other data or combination thereof. The data (content) transmitted from the content source 14 may be encrypted, compressed, or encoded according to any format.

The content source 14 may be, for example, a server (e.g., origin server) that stores the data locally or obtains the data from another server or media source via another network, satellite, cable, or any other communication device. As described below, one or more of the cache nodes 12 may cache data received from the content source. Thus, a cache node 12 that has stored the requested data may be referred to as a source of the content, while the data is cached at that node. The request originator 10 may be any network device operable to request and receive content from content source 14. For example, the request originator 10 may comprise a desktop computer, laptop computer, set-top box, mobile phone, personal digital assistant, tablet, multimedia device, and the like.

In one example, the cache node 12 is configured for use in a content delivery system and operable to acquire and stream media. The content delivery system may include, for example, TV streaming applications for content delivery to digital televisions and set-top boxes, and Internet streaming applications for content delivery to IP devices such as personal computers, mobile phones, and handheld devices.

It is to be understood that the network shown in FIG. 1 and described herein is only an example and that the embodiments may be implemented in networks having different network topologies or network devices, without departing from the scope of the embodiments.

Figure 2:
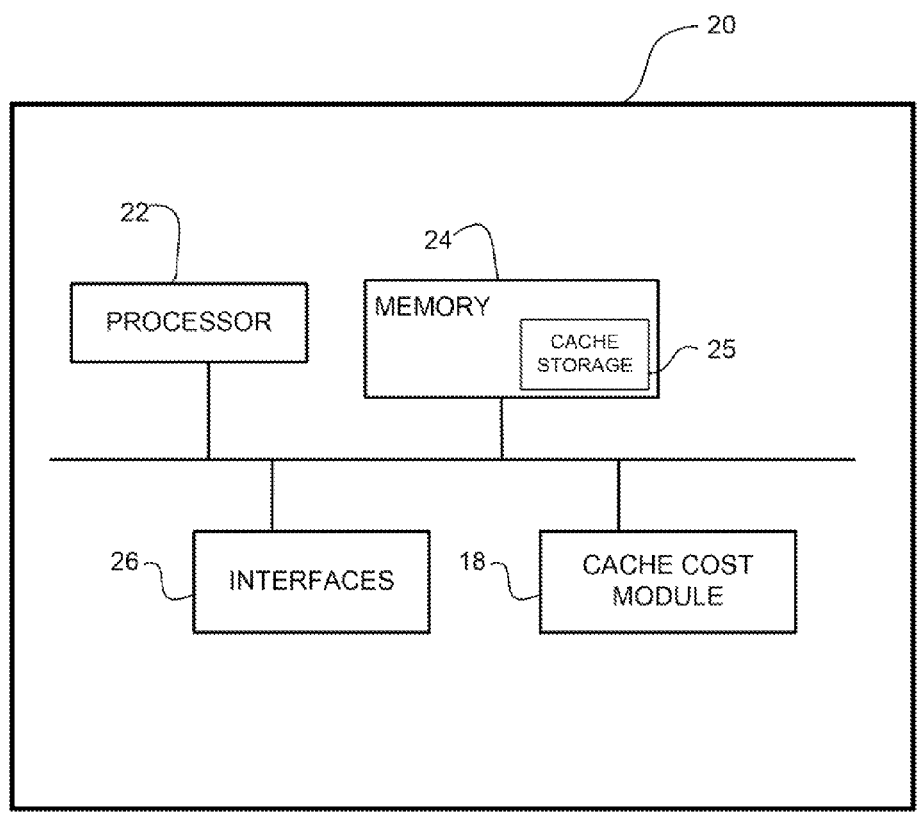
FIG. 2 depicts an example of a network device useful in implementing embodiments described herein.

FIG. 2 illustrates an example of a network device 20 (e.g., cache node) that may be used to implement the embodiments described herein. In one embodiment, the network device 20 is a programmable machine that may be implemented in hardware, software, or any combination thereof. The network device 20 includes one or more processor 22, memory 24, network interfaces 26, and cache cost module 18. Memory 24 may be a volatile memory or non-volatile storage, which stores various applications, operating systems, modules, and data for execution and use by the processor 22. Memory 24 includes cache storage 25.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 26 may comprise any number of interfaces (linecards, ports) for receiving data or transmitting data to other devices. The interfaces 26 may include, for example, an Ethernet interface for connection to a computer or network.

As described in detail below, the cache cost module 18 uses information received from nodes within the data path between the source 14 and data requester 10 to calculate a cost to retrieve the data, for use in determining if the node should cache the data. In one embodiment, if the calculated retrieval cost for the received data is greater than the lowest retrieval cost associated with data currently stored in cache 25, the content is stored in cache and the lowest retrieval cost data is removed.

It is to be understood that the network device 20 shown in FIG. 2 and described above is only an example and that different configurations of network devices may he used. For example, the network device 20 may further include any suitable combination of hardware, software, algorithms, processors, devices, components, or elements operable to facilitate the capabilities described herein.

An overview of a process for determining if the cache node should cache the received data is described below with respect to FIG. 3. Examples for calculating the expected cost of retrieving the data are described further below with respect to FIG. 4.

Figure 3:
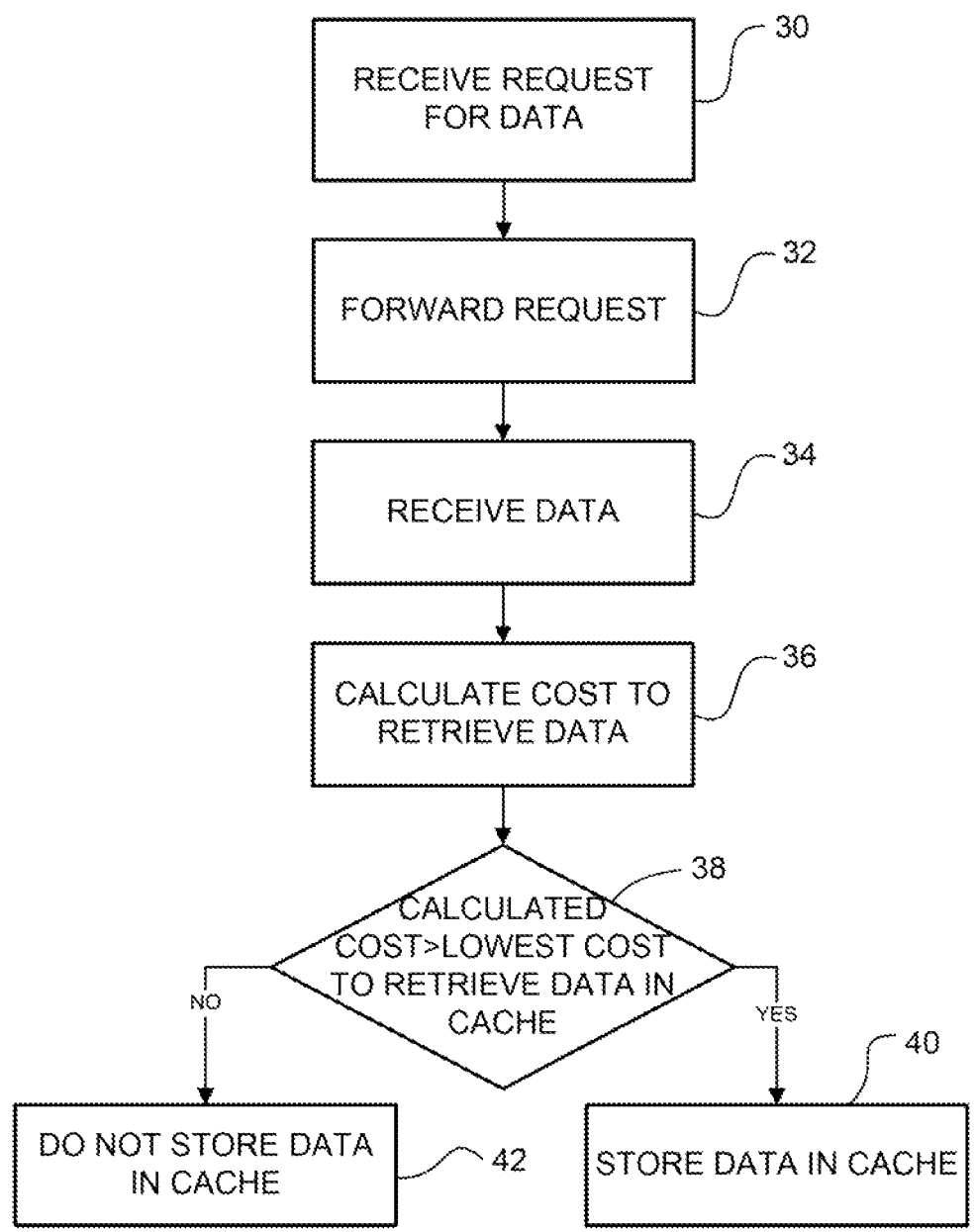
FIG. 3 is a flowchart illustrating an overview of a process for optimizing cache storage, in accordance with one embodiment.

FIG. 3 is a flowchart illustrating a process for determining whether or not to cache data received at a cache node, in accordance with one embodiment. At step 30, the cache node 12 receives a request for data (content) from the request originator 10. As described below, the request may also contain information used in the cost calculation. In this example, the requested data is not stored at the cache node 12. The cache node 12 forwards the request towards the data source 14 (step 32). The data is received at cache node 12 from the source 14 (step 34). As described below, the packet containing the data may also include cost information. The cache node 12 calculates the cost incurred to retrieve (i.e., expected cost to re-retrieve) the data (step 36). Examples of cost factors used in the calculation are described below.

If the calculated cost is greater than the lowest cost to retrieve data already stored in cache, the received data is stored in cache at the cache node 12 and the older data is removed (evicted) (steps 38 and 40). If the calculated cost is lower than the lowest cost to retrieve data already stored in cache, the received content is not stored at the cache node (steps 38 and 42). The cost comparison may include some bias (e.g., the cost to cache the new data may need to be greater than the cost to retrieve stored data by a specified threshold) so that if the costs are close, the new data is not cached. The cache node 12 forwards the data to the requester 10. As described below, the cache node 12 may include cost information with the data it forwards towards the data requester. Any number of cache nodes 12 within the data path may perform the same process to determine if the data should be cached at the node.

It is to be understood that the process shown in FIG. 3 and described above is only an example and that steps may be added, removed, combined, or modified, without departing from the scope of the embodiments.

Figure 4:
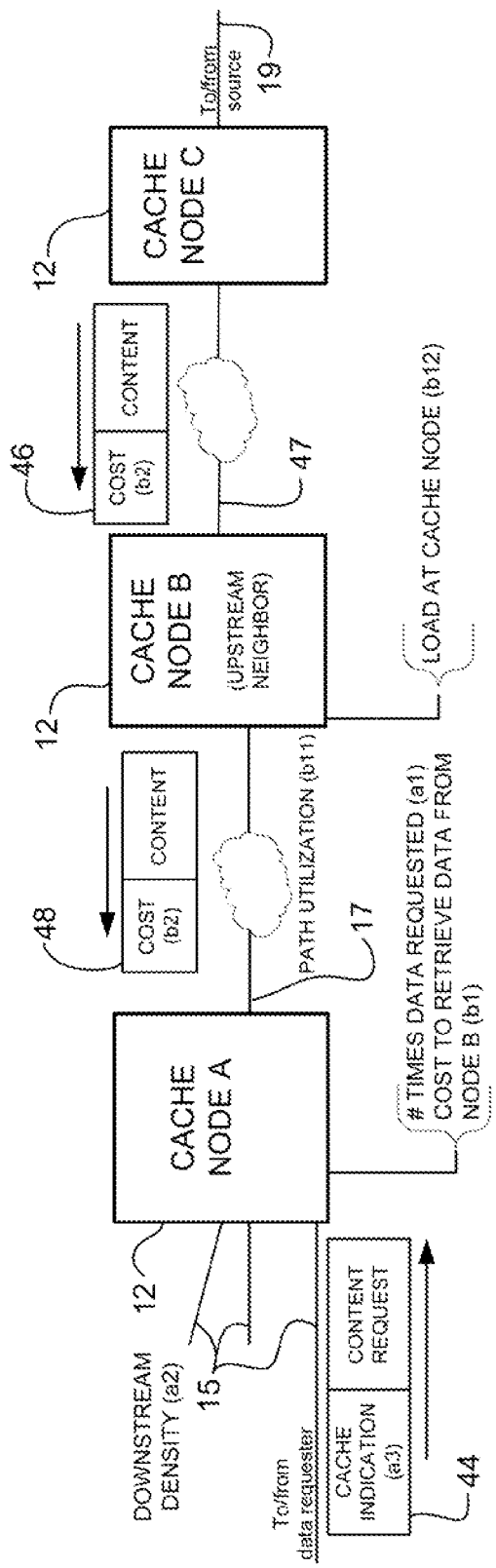
FIG. 4 illustrates a flow of data between cache nodes and information used in cache cost calculations, in accordance with one embodiment.

FIG. 4 illustrates an example of the flow of data in the cache network and information collected at cache node A for use in calculating the expected cost of retrieving data, in accordance with one embodiment. In the following example, the request originator 10 (shown in FIG. 1) transmits a content request 44 to cache node A. Cache node A forwards the request to cache node B, which then forwards the request to cache node C. (For simplification, the content request 44 is only shown transmitted to cache node A.) Cache node C forwards the request to the content source 14. The requested content (data) is transmitted from the content source 14 to the requester 10 via cache node C, cache node B, and cache node A.

Cache node B is referred to herein as an upstream node (immediate upstream node/neighbor) relative to cache node A, and cache node C is referred to as an upstream node relative to cache node B, since the content is transmitted downstream from cache node C to cache node B, and from cache node B to cache node A. As shown in FIG. 4, content requests 44 are sent in the opposite direction (i.e., from data requester to content source via cache nodes A, B, and C). Thus, the terms upstream and downstream as used herein refer to the flow of data from the source 14 to the destination 10 (via cache nodes C, B, and A).

In one embodiment, the content request 44 includes an indication as to whether the downstream node plans to cache the requested data at its cache storage. This indication is referred to in the example below as (a3) and may be a simple yes/no or a cost to cache the data at the downstream node. Each cache node in the data path preferably inserts its own cache indication (a3) in the content request 44 forwarded to its upstream neighbor.

In response to the request, the source 14 transmits the requested data towards the requester 10. Cache node C receives the data and transmits the data to cache node B (as indicated at packet 46). In one embodiment, the packet 46 includes a cost (referred to in the example below as (b2)) for cache node C to retrieve the data from its upstream neighbor. Cache node B receives the data and transmits the data to cache node A (as indicated at packet 48). Before transmitting the data, cache node B adds its cost to retrieve the data from its upstream neighbor (cache node C) to the cost (b2) received in packet 46 and updates the value (b2). The cost (b2) in packet 48 includes the cost for cache node B to retrieve the data and the cost for cache node C to retrieve the data, from their respective upstream neighbors. Cost (b2) is thus cumulative (i.e., includes the cost to retrieve the data from node's upstream neighbor, inserted by each node within the data path from the content source (or a cache node at which the data is stored) to cache node A (node calculating expected cost to retrieve the data)).

In one embodiment, cache node A uses the received information (e.g., cache indication (a3) from downstream node, cost of upstream nodes (cache nodes B and C) to retrieve data (b2)), and other information such as the cost to retrieve data from upstream cache node B (referred to below as (b1)), to calculate an expected cost to retrieve the data. As described below, additional factors such as the number of times the data has been requested (a1) and downstream density (a2) may also be used in the calculation. Also, fewer factors may be used to calculate the cost to retrieve data (e.g., only cost to retrieve data from upstream neighbor (b1), or cost to retrieve data from upstream neighbor (b1) and cost of upstream neighbor(s) to retrieve data (b2), or any other factor or combination of factors.

The following describes an example of cost factors that may be used in calculating an expected cost to retrieve data. In one embodiment, the cost function is a combination of (a) the expectation that the received data will be requested again, and (b) the cost of retrieving the data. The following example is for a cost calculation at cache node A in FIG. 4. As previously described, cache node B is referred to as an upstream node relative to cache node A since the requested data flows from cache node B to cache node A.

In one embodiment, the expectation that the data would be re-requested by a downstream node (e.g., request originator 10 in FIG. 1 or other downstream node) (a) is calculated from a combination of three factors: (a1) the number of times the data has already been requested; (a2) the downstream density at cache node A; and (a3) an indication whether or not the downstream node 10 is going to cache the data. Factor (a1) may be a popularity count, which may be coupled to time-based decay, for example. Factor (a2) describes the number of different interfaces (paths 15 in FIG. 4) on which cache requests are received. Nodes that have a high downstream density (high fan-out) are considered better candidates to cache data than nodes that have a low fan-out. The third factor (a3) may be, for example, a signaled indication included in the data request 44 from the downstream node. Cache indication (a3) may be included in a header of the packet or appended to the packet, for example. The value (a3) may indicate whether or not the downstream node plans to cache the data or may be a cost for the downstream node to cache the data.

In one embodiment, the cost (b) of retrieving the data is computed from a combination of: (b1) the cost of retrieving the data from the immediate upstream node (cache node B); and (b2) the cost for the immediate upstream node to retrieve the data. The cost of retrieving the data from the immediate upstream node (b1) may be estimated based on path utilization (b11) between cache node A and the immediate upstream node (cache node B) and load (b12) at the upstream node (cache node B). Path utilization (b11) may be determined at the cache node A by monitoring the number of requests transmitted on the path 17 and bandwidth usage. The load (b12) is based on available resources (e.g., CPU/disk/memory) at cache node B. Cache node B transmits a load estimate to cache node A and preferably updates the load value at periodic intervals.

The cache nodes 12 are generally not directly adjacent to one another. The paths 17, 47 may include any number of non-cache intermediate nodes or links, as represented by the clouds. In some cases it may not be possible to assess path utilization, in which case the cache node 12 can measure utilization of the last hop (in the downstream direction) terminating on the cache node making the determination.

If the upstream node (cache node B) has the requested data stored in its local cache, then the cost (b2) of retrieving the data by the cache node B is zero (or a constant). If the data is not stored at cache node B, then the cost (b2) for cache node B to retrieve the data is calculated inductively by adding the cost of cache node B to retrieve the data from its upstream neighbor (cache node C) to the cost of cache node C to retrieve the data from its upstream neighbor, and the cost of any other node in the data path to the content source 14 (or node in which the data is cached). The content source 14 may also have a cost associated with retrieving the data, in which case, this cost would also be included. As previously described with respect to FIG. 4, the cost (b2) may be conveyed in the packet transmitting the data 46, 48. For example, the cost (b2) may be inserted in a header or other field in the packet so that when the cache node A receives the data from its upstream neighbor (cache node B), the cost of cache node B retrieving the data would be included with it, and not need to be queried separately, out of band. In one embodiment, an incremented number of hops to the last cached node is used as a cost estimate for (b2). The cache node 12 may set the cost (b2) to zero in the data packet 46, 48 if the node plans to cache the data, or increment the field accordingly if it is not going to cache the data.

The cache node 12 may use any combination of factors to calculate the cost of retrieving the data for use in determining whether or not to cache the data. It is to be understood that the cost factors described above are only examples and one or more of the factors, or any combination thereof may be used in the cost calculation. Various algorithms may be used to take into account the above factors (a1, a2, a3, b1, b2, or any combination thereof) and calculate a value representing an expected cost to retrieve data. For example, values assigned to individual factors may be added together or weights may be applied to one or more factors. In one example, the cost may be represented as a numerical value in a range such as 0-100, or any other range.

As can be observed from the foregoing, the embodiments described herein provide numerous advantages. For example, one or more embodiments may significantly improve the utilization of networked cache nodes by minimizing duplicate copies of content in multiple caches where appropriate. This can be used, for example, where multiple cache nodes are located within a data path between the content source 14 and request originator 10. Unlike conventional schemes, no protocol is needed to describe the presence of individual content elements in caches between the cache nodes. These conventional protocols do not scale well for large caches. The embodiments may operate completely on path and do not require any knowledge of other network/cache elements which do not lie along the path between the source 14 and requester 10. The embodiments therefore scale very well with the addition of cache nodes since major scaling issues with conventional protocols (e.g., size of cache network and number of unique content elements being cached) are not an issue.

One or more embodiments may automatically generate more replicas of extremely popular content. For example, the case of flash crowds may be handled easily since no per-content state needs to be exchanged in control protocols. The embodiments also handle the case where some cache nodes are at network nodes with a low degree of fan-out and others are at points with a high degree of fan-out. Furthermore, the computation of the cost to retrieve data is not expensive. For example, popularity counts are typically already maintained by LFU caches, and the state of the upstream node as well as upstream path utilization is easy to measure. The inductive nature of the cost function means that cache nodes need not receive state from any nodes except their immediate neighbors. The 'hops to cached count' approximation for cost functions also alleviates the need for a globally agreed upon cost function.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving data at a cache node located on a data path between a source of the data and a network device requesting the data; and
   determining if the received data is to be cached at the cache node, wherein determining comprises calculating at the cache node, a cost incurred to retrieve the data;
   wherein the cost comprises an expected cost to retrieve the data if the data is not cached at the cache node and later requested at the cache node.

2. The method of claim 1 wherein determining if the received data is to be cached further comprises comparing said calculated cost to a lowest cost to retrieve data stored in cache storage at the cache node and caching the data if said calculated cost is higher than said lowest cost to retrieve the stored data.

3. The method of claim 1 wherein calculating the cost comprises calculating the cost to retrieve the data from a neighbor node.

4. The method of claim 3 wherein the cost to retrieve the data from the neighbor node is based on utilization of a path between the neighbor node and the cache node and a load at the neighbor node.

5. The method of claim 1 wherein the cost to retrieve the data is based on a cost of the neighbor node to retrieve the data.

6. The method of claim 5 wherein the cost of the neighbor node to retrieve the data comprises a cumulative cost of the neighbor node, and any other nodes in a data path between the neighbor node and the source of the data, to retrieve the data from its neighbor node.

7. The method of claim 5 further comprising receiving the cost of the neighbor node to retrieve the data in a packet comprising the data.

8. The method of claim 1 wherein determining if the received data is to be cached at the cache node further comprises calculating an expectation that the data will be requested again at the cache node.

9. The method of claim 8 wherein the expectation that the data will be requested is based on whether or not a downstream node is planning to cache the data.

10. The method of claim 9 further comprising receiving an indication as to whether or not the downstream node is planning to cache the data in a packet comprising a request for the data.

11. The method of claim 1 wherein the cost to retrieve the data is based on a cost for the cache node and any other cache node in a data path between the source and the cache node, to retrieve the data from its upstream neighbor and wherein calculating a cost to retrieve the data comprises utilizing cost information received with the data from the upstream neighbor.

12. An apparatus comprising:
   a processor for processing data received in a network of cache nodes, on a data path between a source of the data and a network device requesting the data, and determining if the received data is to be cached at the apparatus, wherein determining comprises calculating a cost incurred to retrieve the data; and
   cache storage for storing cached data;
   wherein the cost comprises an expected cost to retrieve the data if the data is not cached at the apparatus and later requested at the apparatus.

13. The apparatus of claim 12 wherein the processor is further configured to compare said calculated cost to a lowest cost to retrieve data stored in the cache storage and cache the data if said calculated cost is higher than said lowest cost to retrieve the stored data.

14. The apparatus of claim 12 wherein calculating the cost comprises calculating a cost to retrieve the data from a neighbor node.

15. The apparatus of claim 14 wherein the cost to retrieve the data from the neighbor node is based on utilization of a path between the neighbor node and the apparatus and a load at the neighbor node.

16. The apparatus of claim 12 wherein the cost to retrieve the data is based on a cost to retrieve the data from a neighbor node and a cost of the neighbor node to retrieve the data.

17. The apparatus of claim 16 wherein the cost of the neighbor node to retrieve the data is received in a packet comprising the data.

18. The apparatus of claim 12 wherein determining if the received data is to be cached further comprises calculating an expectation that the data will be requested again.

19. The apparatus of claim 18 wherein the expectation is based on whether or not a downstream node is planning to cache the data.

20. Logic encoded on non-transitory computer readable storage media for execution and when executed operable to:
    receive data at a cache node located on a data path between a source of the data and a network device requesting the data; and
    determine if the received data is to be cached at the cache node, wherein determining comprises calculating a cost incurred to retrieve the data;
    wherein the cost comprises an expected cost to retrieve the data if the data is not cached at the cache node and later requested at the cache node.

* * * * *